March 17, 1931.  J. F. O'CONNOR  1,796,615
FRICTION SHOCK ABSORBING MECHANISM
Original Filed March 2, 1923   2 Sheets-Sheet 2
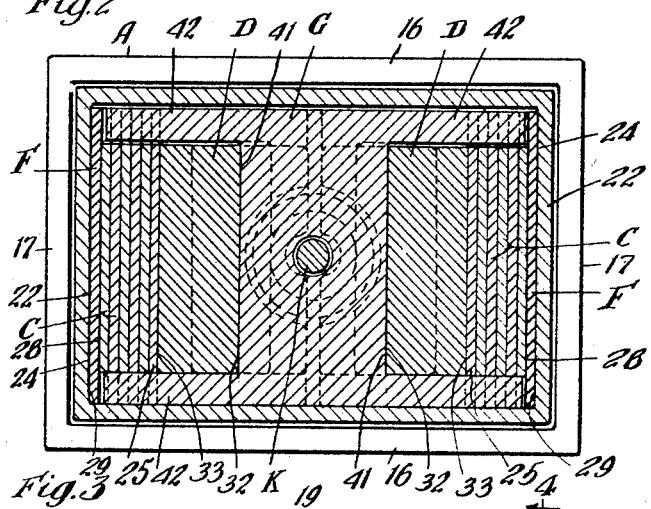
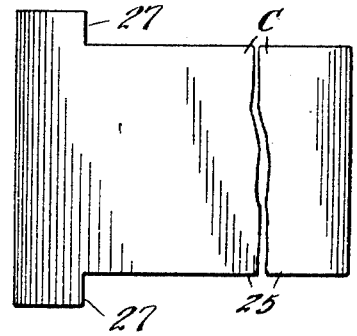
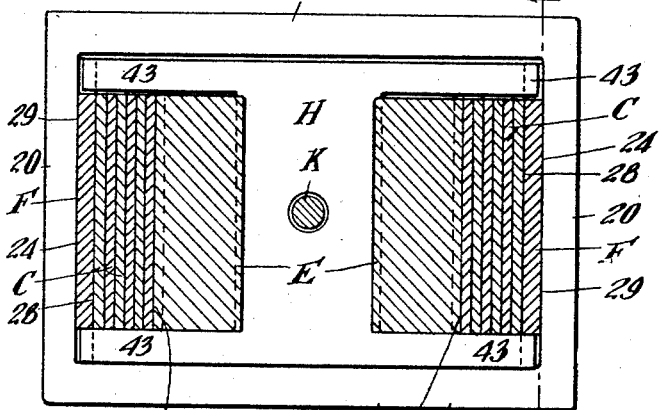
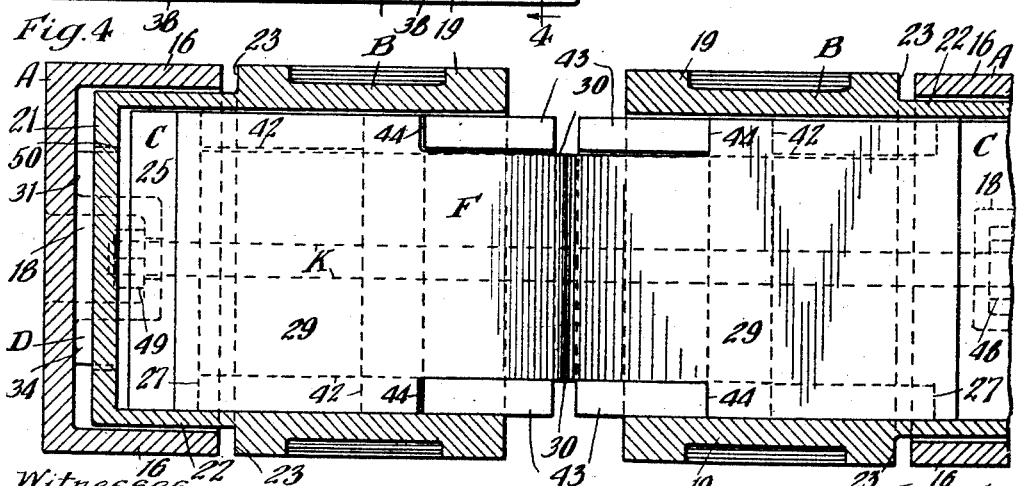
Inventor
John F. O'Connor
By George I. Haight
His Atty.

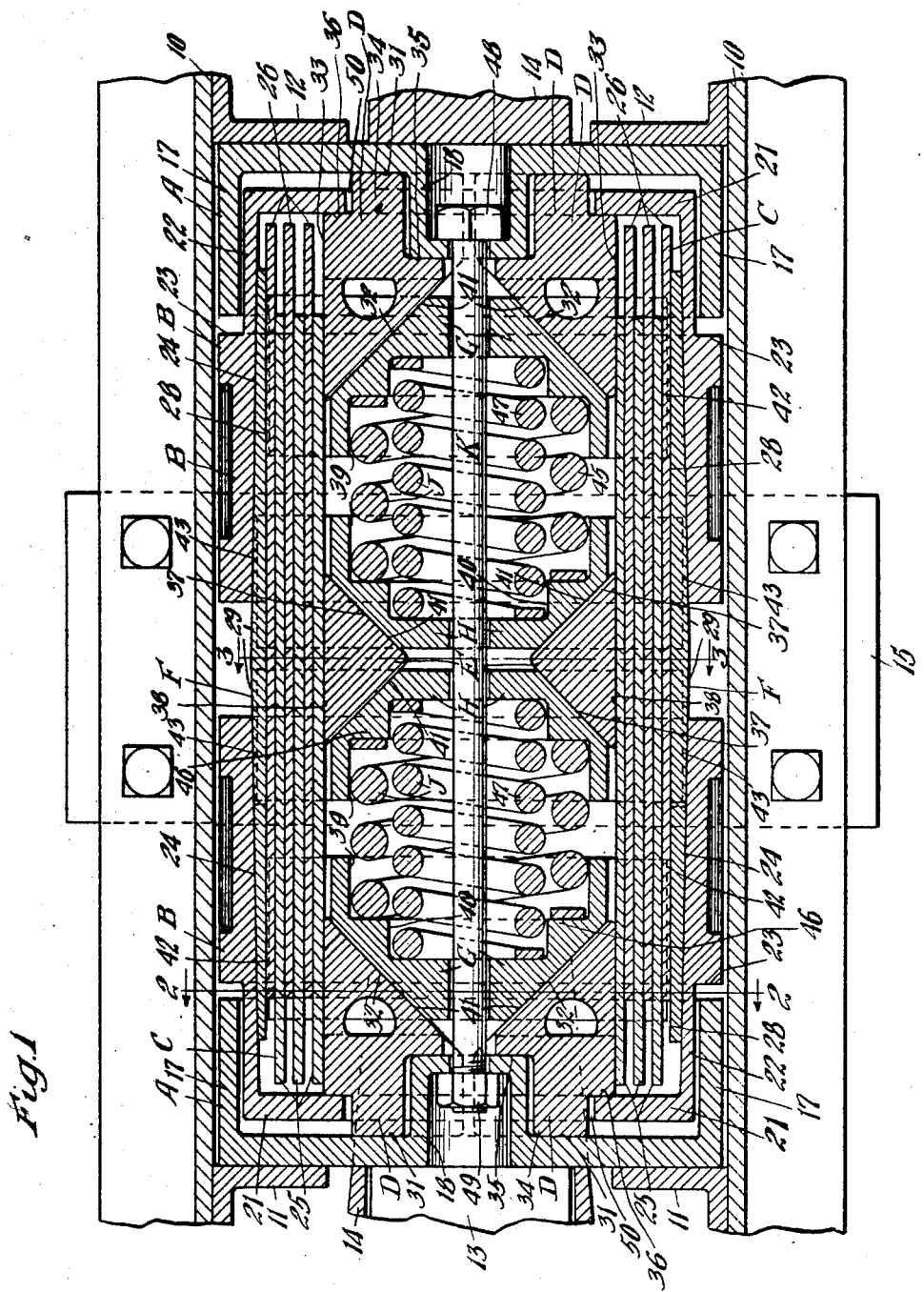

Patented Mar. 17, 1931

1,796,615

UNITED STATES PATENT OFFICE

JOHN F. O'CONNOR, OF CHICAGO, ILLINOIS, ASSIGNOR, BY MESNE ASSIGNMENTS, TO W. H. MINER, INC., A CORPORATION OF DELAWARE

FRICTION SHOCK-ABSORBING MECHANISM

Application filed March 2, 1923, Serial No. 622,290. Renewed July 29, 1926.

This invention relates to improvements in friction shock absorbing mechanisms.

One object of the invention is to provide a friction shock absorbing mechanism, more particularly adapted for railway draft riggings, wherein is obtained high capacity due to large frictional areas, and wherein a differential wedge action is made use of to assure quick and certain release of a plurality of friction plates.

Another object of the invention is to provide a friction shock absorbing mechanism of the type referred to, wherein a graduated action in both compression and release is obtained, by producing a preliminary action of the followers and wedges prior to the differential wedge action, and effecting relative movement of the friction plates after the differential wedge action has progressed to a predetermined extent.

A still further and more specific object of the invention is to provide a friction shock absorbing mechanism of the intercalated plate type, including, front and rear followers; a plurality of tapering friction elements co-acting with the plates; a pair of relatively movable friction shells enclosing the friction elements and plates; and a plurality of friction wedges also co-acting with the plates, so arranged that a preliminary action of the followers and wedges takes place prior to the action of the friction shells, and the friction plates are engaged and moved relative to each other by the shells after a predetermined movement of the latter, whereby, during compression of the mechanism, a wedging action is first set up between the wedges and the intercalated plates and friction created there between, the friction wedges sliding on the adjacent plates until the shells are picked up by the followers and moved relatively to the tapered friction elements adding the friction resistance therebetween, until the end of the friction plates are engaged by the shells and moved relatively to each other, adding the frictional resistance of the intercalated plates.

Other objects and advantages of the invention will more clearly appear from the description and claims hereinafter following.

Fig. 1 is a horizontal, longitudinal sectional view of a portion of a draft rigging showing my improved shock absorbing mechanism in connection therewith. Fig. 2 is a vertical transverse sectional view, corresponding substantially to the line 2—2 of Fig. 1. Fig. 3 is a vertical transverse sectional view corresponding substantially to the line 3—3 of Fig. 1. Fig. 4 is a vertical, longitudinal sectional view corresponding substantially to the line 4—4 of Fig. 3. And Fig. 5 is a detail, side elevational view of one of the friction plates.

In said drawings, 10—10 indicate channel draft sills, to the inner faces of which are secured front stop lugs 11 and rear stop lugs 12. A portion of the draw-bar is shown at 13, to which is attached a hooded yoke 14. The shock absorbing mechanism proper, including front and rear followers, is disposed within the yoke 14, and the movable parts of the draft rigging are supported by the detachable saddle plate 15.

The improved shock absorbing mechanism proper, as shown, comprises, broadly, front and rear followers A—A; front and rear friction shells B—B; two groups of friction plates C—C; two pairs of front and rear, end wedges D—D; a pair of central wedges E—E; a pair of tapering friction elements F—F; an outer pair of combined wedge and spring follower caps G—G; an inner pair of combined wedge and spring follower caps H—H; tandem arranged spring resistance elements J—J; and a retainer bolt K.

The front and rear followers A are of similar construction, and co-act respectively with the front and rear stop lugs. As clearly shown, each of the followers A is of rectangular form and is provided with spaced, horizontal, inwardly projecting top and bottom flanges 16—16, vertically arranged, spaced, longitudinally projecting side flanges 17—17; and an inwardly projecting central, hollow boss 18.

The friction shells B are of similar construction, each being of substantially box-like shape and comprising spaced, horizontally extending, top and bottom walls 19—19, vertically extending, spaced, side walls 20—20 and end walls 21. The end walls 21 of the front and rear friction shells B are each provided with a central opening 50 of rectangular outline adapted to accommodate the ends of the wedges D and the corresponding boss 18. The shells are exteriorly reduced in size at their closed ends as indicated at 22, thereby providing shoulders 23 on the top, bottom and side walls thereof. The reduced end portions 22 of the shells are loosely received within the front and rear followers, and the shoulders 23 are so spaced from the closed ends of the shells as to engage with the free ends of the top, bottom and side flanges of the followers A when the inner faces of the latter are brought into abutting relation with the end walls 21 of the shells B. The side walls 20 of each shell B are provided with interior, oppositely arranged, friction surfaces 24, converging inwardly from the open end to the closed end of the shell. The shells are normally spaced apart a proper distance, so that, when the gear is fully compressed, with the followers in abutment with the outer ends of the shells, the inner ends of the latter will abut, and the actuating force will be transmitted directly from one shell to the other.

The friction plates C are arranged within the shells B and comprise two oppositely disposed groups. As herein shown, the groups of plates C each comprise three plates 25 and three plates 26, the plates 25 and 26 being alternated, with a plate 26 of each group arranged outer-most and in contact with the inner face of one of the tapering friction elements F. The plates 25 and 26 are of similar construction and as best shown in Fig. 5, each is formed with upper and lower projections at one end thereof to provide alined upper and lower shoulders 27 for a purpose hereinafter described.

Arranged between each of the groups of friction plates C and the adjacent side walls 20 of the shells B is a tapering friction element F. As clearly shown in the Figures 1 and 4, each of the tapering friction elements F is in the form of a rectangular plate provided with an inner flat friction face 28 adapted to co-act with the outer friction surface of the outer-most friction plates 26 of one of the groups of plates. The outer face of each tapering element F is oppositely inclined outwardly from the center toward the opposite ends thereof, thereby providing oppositely extending surfaces 29 slightly inclined with reference to the longitudinal axis of the shock absorbing mechanism. As clearly shown in Fig. 1, each of the surfaces 29 of the friction elements F, co-acts with the corresponding inner friction surface 24 of one of the shells B and is arranged parallel thereto. As shown in Fig. 3, each plate F has upper and lower edges cut away at the center thereof to provide a recess 30, for a purpose hereinafter described.

The wedges D are four in number, and are arranged at opposite ends of the shock absorbing mechanism, one pair being adapted to co-act with each follower casing. Each of the wedge blocks D is provided with an outer flat face 31, adapted to abut the inner face of the end wall of the follower A, an inner wedge face 32 and a flat side face 33 adapted to engage with the innermost friction plate 25 of one of the groups of plates C. As clearly shown in Fig. 1, each of the wedge blocks C is reduced in width at the outer end, as indicated at 34, by cutting away the opposite side faces, thereby providing shoulders 35 and 36. The reduced outer end portions 34 of the wedges are adapted to project through the openings 50 in the end walls of the shells, with the outer faces 31 thereof abutting the inner faces of the followers, and the shoulders 35 abutting the inner ends of the hollow bosses 18. The shoulders 36 are adapted to co-act with the inner faces of the end walls 21 of the shells and are so spaced with reference to the outer ends of the wedges that, when the parts have been returned to normal position after compression of the mechanism, the shoulders 36 will be in abutment with the end walls 21, with the outer faces of the latter spaced a short distance from the inner faces of the followers, as clearly shown in Fig. 1.

The central wedge blocks E are of like construction and are arranged on opposite sides of the shock absorbing mechanism. Each of the central wedge blocks E is of triangular shape in horizontal cross section, and is provided with a pair of inwardly converging wedge faces 37 adapted to co-act with inner pair of central wedge and spring follower caps H, and an outer flat friction face 38 abutting the inner-most friction plate 25 of one of the groups of plates C.

The combined wedge and spring follower caps are four in number, comprising an outer pair G—G, and an inner pair H—H. Each of the combined wedge and spring follower caps, as clearly shown in Fig. 1, is provided with an axial bore 39 countersunk as indicated at 40, and adapted to receive one end of one of the spring resistance elements J. At the outer end, each of the spring caps is provided with a pair of converging wedge faces 41, the wedge faces 41 of the outer pair of caps G being adapted to co-act with the wedge faces 32 of the wedge blocks D, and the wedge faces 41 of the inner pair of caps H being adapted to co-act with the wedge faces 37 of the central wedges E. Each of the outer combined wedge and spring follower caps G is provided with pairs of upper and lower laterally extending lugs 42, on the opposite sides thereof, adapted to engage with the shoulders 27 of the friction plates C, the lugs 42 being vertically spaced apart the proper distance to loosely receive the plates C and the reduced inner ends of the wedges D therebetween.

Each of the inner combined wedge and spring follower caps H is also provided with pairs of upper and lower, laterally extending lugs 43 on the opposite sides thereof; spaced apart vertically the proper distance to loosely receive the wedges E and the plates C therebetween, and having the outer end portions thereof received within the recesses 30 and adapted to co-act with shoulders 44 at the opposed ends of the latter. As clearly shown in Figs. 1 and 4, the opposed inner caps H and the lugs thereof are normally spaced apart a sufficient distance to permit the necessary relative approaching movement of the parts during the compression of the gear.

The spring resistance elements J are arranged in tandem, each co-operating with an outer and inner combined wedge and spring follower caps G and H, respectively. Each of the spring resistance elements J comprises an outer, relatively heavy, coiled spring 45 adapted to abut the shoulders 46 formed by the counter bore 40 of the caps G and H, and an inner, relatively lighter, coiled spring 47 received in the counter bored position 40 and adapted to abut the end walls of the combined wedge and spring follower caps G and H.

The shock absorbing mechanism is held under initial compression by the retainer bolt K passing through the inner springs 47 and alined recesses in the combined wedge and spring follower caps G and H, having one end thereof anchored to the rear shell A by means of the head 48 received within the hollow boss 18 of the rear shell A and having the other end thereof anchored to the front follower shell A by means of the nut 49 received within the hollow boss 18 of the front follower shell.

When the parts are in normal position as clearly shown in Fig. 1, the outer combined wedge and spring follower caps G have the wedge faces thereof in engagement with the wedge faces on the wedge blocks D and are held in the extreme outer position by the expansive force of the spring resistance elements J, with the lugs 42 in engagement with the shoulders 27 of the friction plates C. In this position of the parts, the shoulders 36 of the wedge blocks D are in abutment with the inner faces of the end walls 21 of the friction shells B, retaining the latter in proper spaced relation with respect to the front and rear followers. As shown in Fig. 1, the plates 25 and 26 are alternated and reversely arranged, with the shoulders 27 of the friction plates 25 engaging the lugs 42 of the combined wedge and spring follower cap G at the front end of the gear, and the shoulders 27 of the plates 26 engaging the lugs 42 of the combined wedge and spring follower cap G at the rear end of the gear, thereby holding the opposite ends of each of the sets of plates 25 and 26 slightly spaced from the adjacent end wall 21 of the corresponding friction shell B.

In the operation of my improved shock absorbing mechanism, assuming that the front follower A is being moved rearwardly toward the rear follower during buff, a wedging action will be set up between the wedges D and the combined wedge and spring follower caps G, and between the central wedges E and the combined wedge and spring follower caps H, effecting a corresponding compression of the spring resistance elements J, whereupon the outer faces of the wedges D and E will be forced into tight engagement with the groups of friction plates C, thereby putting the friction plates and the tapering friction elements F under pressure and augmenting the frictional resistance between the same. During the further inward movement of the follower A, the frictional resistance between the wedges D and E and the inner plates 25 is overcome, and the wedges and plates will slide relatively until the followers engage with and move the friction shells, whereupon, due to the wedging action between the faces 24 of the front friction shell and the faces 29 of the tapering friction elements F and the wedging action between the inner combined wedge and spring follower caps H and the central wedge E, there will be a tendency for the tapering friction elements F to move rearwardly with the friction shell B. As there is a corresponding wedging action between the inner walls of the rear friction shell B and the tapering friction elements F, between the central wedges E and the combined wedge and spring follower cap H associated with the rear friction shell and between the rear wedges D and cap G, there will be a balancing tendency to prevent rearward movement of the tapering friction elements F. Due to this balancing of the friction tending to move the tapering friction elements rearwardly and the frictional resistance tending to oppose the movement of the same, the latter will be moved rearwardly a distance equal to one-half of the movement of the front friction shell B. During this movement of the tapering friction elements F there will be an equal bodily rearward movement of the friction plates C due to the clamping action of the wedges D and E and the friction elements F, thereby maintaining the spacing between the ends of the two sets of plates and the end walls of the friction shells B constantly substantially equal, as the end walls of the shells approach the ends of the plates. During this inward movement of the front follower A and the friction shell B, the lugs 42 on the caps G and the shoulders 27 on the plates C will be moved out of contact and the ends walls 21 of the friction shells will gradually approach the ends of the respective sets of friction plates 25 and 26, until the same are engaged thereby and are moved therewith. Upon further movement of the front follower and the friction shell, the friction plates 25 will be moved therewith, relatively to the friction plates 26, opposed by the frictional resistance therebetween due to the wedging action of the mechanism. A differential wedge action will be set up during the described operation of the mechanism. Due to the wedging action between the outwardly converging faces of the tapering friction elements F and shells B there is a lateral inward bodily movement of the groups of friction plates C and a corresponding inward movement toward the axis of the gear of the wedges D and E, causing the wedge faces thereof to move inwardly on the wedge faces of the combined wedge and spring follower caps G and H, effecting an additional compression of the spring resistance elements J. It will also be evident that, as the caps H approach separate from each other during the compression of the mechanism, the lugs 43 thereof will be moved outward slightly, proper clearance therefor being provided in the recess 30 as clearly shown in Fig. 4.

During the draft action of the shock absorbing mechanism, the operation is similar to that just described, the only difference being that the rear follower A is moved relatively to the front follower A.

Upon discontinuance of the pressure on the shock absorbing mechanism, the wedge blocks D will be caused to move outwardly first, by the expansion of the springs H, thus effecting the prompt release of the wedge mechanism and an immediate decrease of pressure on the friction plates. During the outward movement of the wedges D and the combined wedge and spring follower caps G, the shoulders 36 on the wedge blocks D will approach the inner faces of the end walls of the friction shells B and the lugs 42 on the combined wedge and spring follower caps G will approach the shoulders 27 of the friction plates B. The shoulders 36 on the wedge blocks D will engage with the inner faces of the end walls of the friction shells before the lugs 42 of the caps G engage with the shoulders 27 of the friction plates C and the shells will be moved outwardly with reference to the tapering friction elements F, thereby further reducing the wedging action. Finally the plates B will be picked up by the lugs 42 on the caps C and restored to their original position, with the free ends thereof slightly spaced from the inner faces of the walls 21 of the front and rear friction shells. The expansive action of the springs will also effect the centering of the tapering friction elements F, through the action of the lugs 43 on the inner combined wedge and friction caps H by one of said lugs engaging with one of the shoulders 44 of the friction elements F.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with oppositely arranged, front and rear followers; of a pair of front and rear friction shells provided respectively with forwardly and rearwardly converging friction surfaces on the interior thereof, said shells being normally spaced apart and adapted to be moved relatively to each other by said followers; a longitudinally arranged, wedge-actuated, lateral pressure creating means interposed between said followers; a spring resistance; longitudinally arranged friction plates adapted for relative movement upon relative movement of the friction shells, said plates being divided into two groups on opposite sides of said wedge pressure creating means; and friction means interposed between each group of plates and the adjacent friction surfaces of said shells.

2. In a friction shock absorbing mechanism, the combination with front and rear followers; of oppositely arranged, front and rear friction shells, provided with interior friction surfaces converging toward the opposite ends of the mechanism, said shells being adapted to be moved relatively by said followers; a longitudinally arranged, wedge pressure creating means co-acting with said followers; a spring resistance longitudinally arranged, co-acting friction plates adapted to be moved relatively upon relative movement of the friction shells, said plates being divided into two groups on opposite sides of said wedge pressure creating means; and an oppositely tapering friction plate interposed between each group of plates and the adjacent friction surfaces of said shells.

3. In a friction shock absorbing mechanism, the combination with front and rear followers; of front and rear shells, each provided with oppositely disposed, longitudinally extending, friction surfaces, said surfaces being inclined with reference to the longitudinal axis of the mechanism; a wedge pressure creating means interposed between said followers; a spring resistance;

longitudinally arranged friction plates adapted for relative movement upon relative movement of said friction shells, said plates being divided into two groups on opposite sides of said wedge pressure creating means; and longitudinally arranged, oppositely tapering, elements interposed between each group of plates and adjacent friction surfaces of the shells.

4. In a friction shock absorbing mechanism, the combination with a plurality of groups of intercalated friction plates; of a wedge pressure creating means interposed between said groups of plates; a spring resistance; a tapering friction element co-acting with each group of plates; front and rear friction shells co-operating with said wedge pressure creating means, and adapted to move said friction plates relatively to each other, each of said shells being provided with longitudinally arranged friction surfaces inclined with reference to the axis of the mechanism and co-acting with said tapering friction elements; and front and rear followers co-acting with said friction shells and said wedge pressure creating means.

5. In a friction shock absorbing mechanism, the combination with a plurality of sets of relatively movable intercalated friction plates, divided into two groups; of a front friction casing co-acting with one set of plates and provided with forwardly converging friction surfaces on the interior thereof; a rear friction casing co-acting with the other set of plates and provided with rearwardly converging friction surfaces on the interior thereof; a friction element interposed between each group of plates and the adjacent friction surfaces of said casings, said element being provided with oppositely extending friction surfaces, one of said surfaces being arranged parallel to and co-acting with one of the friction surfaces of the front casing, and the other of said surfaces being arranged parallel to and co-acting with one of the friction surfaces of said rear casing; front and rear followers co-acting with said friction casings; a wedge pressure creating means interposed between said groups of plates and adapted to be actuated by the relative movement of the followers; a spring resistance means co-acting with said last-named means.

6. In a friction shock absorbing mechanism, the combination with front and rear followers; of front and rear friction members adapted to be moved longitudinally by said followers and provided with opposite, longitudinally arranged, friction surfaces; a longitudinally arranged, wedge pressure creating means interposed between said followers and adapted to be actuated thereby; spring resistance means; longitudinally arranged friction plates adapted for relative movement upon relative movement of the friction members, said plates being divided into two groups on opposite sides of said wedge pressure creating means; and a tapering friction element interposed between each group of plates and the adjacent friction surfaces of said friction members, and provided with friction surfaces co-operating with said adjacent friction surfaces of the front and rear friction members.

7. In a friction shock absorbing mechanism, the combination with oppositely arranged, front and rear, followers; of a pair of friction shells provided with interior friction surfaces, said shells being normally spaced apart and adapted to be moved relatively by said followers; a plurality of wedge blocks movable with said followers; wedge elements co-operating with said wedge blocks; spring resistance means co-operating with said elements; longitudinally arranged friction plates adapted for relative movement upon relative movement of the friction shells, said plates being divided into two groups on opposite sides of said wedge pressure creating means, each group comprising two sets of plates; means arranged to engage each plate near one end thereof for restoring each set of plates to normal position; and a friction element interposed between each group of plates and the adjacent friction surfaces of said friction shells.

8. In a friction shock absorbing mechanism, the combination with oppositely arranged, front and rear, followers; of a pair of friction shells having end walls and interior friction surfaces, said shells being normally spaced apart and adapted to be moved relatively by said followers; lateral wedge pressure creating means co-operating with said follows; spring resistance means cooperating with said last-named means; longitudinally arranged friction plates adapted for relative movement upon relative movement of the friction shells, said plates being divided into two groups on opposite sides of said wedge pressure creating means, each group comprising two sets of plates; a tapering friction element interposed between each group of plates and the adjacent friction surface of said shells; means for restoring the shells and plates to normal position, with the shells slightly spaced from the followers and with the plates of each set spaced from the end walls of the friction shells, to permit preliminary action of said followers and wedge pressure creating means prior to engagement of the followers with the friction shells and of the shells with the plates to actuate the latter.

9. In a friction shock absorbing mechanism, the combination with front and rear, relatively movable followers; of a pair of relatively movable friction shells provided with longitudinally arranged friction surfaces; a plurality of longitudinally arranged friction plates adapted for relative movement upon relative movement of said shells, said plates being divided into two groups, each group comprising two sets of plates; a tapering friction element interposed between each group of plates and the adjacent friction surfaces of said shells; and lateral wedge pressure creating means interposed between said two groups of plates and cooperating with said followers, said means including wedge elements, spring resistance means and spring followers, said spring followers being provided with means rigid therewith for engaging corresponding ends of the friction plates of each set for returning the same to normal position spaced from the adjacent shells to permit preliminary action of said shells, followers and wedge pressure creating means prior to engagement of the shells with the friction plates to actuate the latter.

10. In a friction shock absorbing mechanism, the combination with a plurality of sets of relatively movable intercalated friction plates, divided into two groups; of front and rear followers; a front friction shell co-acting with one set of plates, said shell being provided with longitudinally arranged, interior, friction surfaces; a rear friction shell co-acting with the other set of plates, said shell being provided with longitudinally arranged, interior, friction surfaces; a friction element interposed between each group of plates and the adjacent friction surfaces of said shells; and a lateral pressure creating means interposed between said groups of plates, said lateral pressure creating means including wedge blocks movable with said followers, central wedges having flat faces engaging the inner sides of the groups of plates, additional wedges co-acting with said first named wedges and said central wedges, and tandem arranged springs co-acting with said additional wedges.

11. In a friction shock absorbing mechanism, the combination with a plurality of sets of relatively movable, intercalated friction plates, divided into two groups; of front and rear followers; a front friction shell co-acting with one set of plates, said shell being provided with longitudinally arranged, interior, friction surfaces; a rear friction shell co-acting with the other set of plates, said shell being provided with longitudinally arranged, interior, friction surfaces; a friction element interposed between each group of plates and the adjacent friction surfaces of said shells; a wedge pressure creating means interposed between said groups of plates including a pair of wedge blocks movable with each follower, each of said wedge blocks having a shoulder co-acting with the adjacent shell for returning the latter to normal position, when the actuating pressure is removed, and spring resistance means cooperating with said wedge pressure creating means.

12. In a friction shock absorbing mechanism, the combination with front and rear followers; of a pair of oppositely arranged, front and rear, friction shells provided with interior friction surfaces, said shells being normally spaced apart and adapted to be moved relatively by said followers; of a wedge pressure creating means, including wedge blocks co-acting with the front and rear followers respectively, tandem arranged springs, central wedges between the adjacent ends of said springs, a combined wedge and spring follower interposed between the central wedges and the adjacent end of each spring, an outer combined wedge and spring follower interposed between the springs and wedge blocks co-acting with the front follower, and an outer combined wedge and spring follower interposed between the springs and the wedge blocks co-acting with the rear follower; longitudinally arranged sets of friction plates adapted for relative movement upon relative movement of said friction shells, said plates being arranged in two groups on opposite sides of said wedge pressure creating means; a friction element interposed between each group of friction plates and the adjacent friction surfaces of said shells; inter-engaging means on corresponding ends of one set of friction plates and one of said outer combined wedges and spring followers, and on corresponding ends of the other of said sets of friction plates and the other outer combined wedge and spring follower for restoring the friction plates to normal position; and interengaging means on said friction elements and the inner combined wedges and spring followers for restoring said elements to normal position.

13. In a friction shock absorbing mechanism, the combination with oppositely arranged, front and rear followers; of a pair of front and rear friction shells provided respectively with forwardly and rearwardly converging friction surfaces on the interior thereof, said shells being normally spaced apart and adapted to be moved relatively to each other by said followers; a longitudinally arranged, wedge-actuated, lateral pressure creating means interposed between said followers; spring resistance means cooperating with said last-named means; longitudinally arranged friction plates normally spaced from said followers and adapted for relative movement upon relative movement of the friction shells, said plates being divided into two groups on opposite sides of said wedge pressure creating means; and co-acting means on said wedge actuated means and said shells for returning the latter to normal position.

14. In a friction shock absorbing mechanism, the combination with front and rear follower members adapted to move relatively toward and from each other; of a pair of friction shells adapted to be moved relatively upon a predetermined movement of said followers, a group of longitudinally extending, intercalated friction plates interposed between said friction shells and adapted to be shifted longitudinally relatively to each other after a predetermined relative approach of said friction shells, said group of plates being responsive to laterally applied pressure; lateral pressure creating means co-operable with said group of friction plates and operative upon relative approach of said follower members; and spring resistance elements cooperating with said lateral pressure creating means.

15. In a friction shock absorbing mechanism, the combination with front and rear followers relatively movable toward each other; of front and rear friction casings also relatively movable toward each other and normally spaced from said followers and adapted to be engaged and moved by said followers after a predetermined compression of the mechanism, each of said casings being provided with abutment means; lateral wedge pressure creating means directly engaging said followers, said means including friction shoes; longitudinally arranged friction plates within said casings adapted for relative movement, said plates being divided into two groups on opposite sides of the wedge pressure-creating means, alternate plates of each group having their front ends spaced from the abutment means on said front casing and the remaining plates having their rear ends normally spaced from the abutment means of the rear casing, said plates being adapted to be engaged by said abutment means and moved relatively after a predetermined relative movement of said casings; and a main spring resistance coacting with said lateral pressure-creating means.

16. In a friction shock aborbing mechanism, the combination with front and rear followers relatively movable toward each other; of front and rear, lateral pressure-resisting elements, said elements being movable relatively toward each other and normally spaced from the corresponding followers, said members each having abutment means thereon; lateral pressure-creating means directly engaged by said followers, said means including friction shoes; longitudinally arranged friction plates engaging said elements, said plates being adapted for relative movement and alternate plates having their front ends spaced from the abutment means on said front element and the remaining plates having their rear ends normally spaced from the abutment means of said rear element, said plates being adapted to be engaged by said abutment means and moved relatively after a predetermined relative movement of said elements; and a main spring resistance coacting with said lateral pressure-creating means.

17. In a friction shock absorbing mechanism, the combination with front and rear followers relatively movable toward each other; of front and rear friction casings also relatively movable toward each other, each casing being normally slightly spaced from the corresponding follower; lateral wedge pressure-transmitting means directly engaging said followers, said means including friction shoes; relatively movable, longitudinally disposed friction plates within said casings, said plates being divided into two groups on opposite sides of the wedge pressure-transmitting means, each group comprising two sets of plates, one set having their forward ends normally spaced from the end wall of the front casing and the other set having their rear ends normally spaced from the end wall of the rear casing; a main spring resistance co-acting with said lateral pressure-transmitting means; and means for restoring said plates and casings to normal position during release.

18. In a friction shock absorbing mechanism, the combination with front and rear followers relatively movable toward each other; of front and rear friction casings also relatively movable toward each other, each casing being normally slightly spaced from the corresponding follower; lateral wedge pressure-creating means directly co-acting with said followers, said means including friction shoes, said shoes being adapted to engage said casings to restore the same to normal position; longitudinally arranged friction plates within said casings, said plates being divided into two groups on opposite sides of said wedge pressure-creating means, the plates of each of said groups being relatively movable during the compression stroke of the mechanism; a main spring resistance; and means for restoring said plates to normal position.

19. In a friction shock absorbing mechanism, the combination with front and rear followers relatively movable toward each other; of front and rear friction casings also relatively movable toward each other, each of said casings being normally spaced from the corresponding follower; wedge pressure-creating means, the plates of each of said means including friction shoes normally abutting the outer end walls of the casings and adapted to restore the latter to normal full release position; longitudinally arranged friction plates within said casings, said plates being divided into two groups on opposite sides of said wedge pressure-creating means and each group comprising two sets of relatively movable plates; a spring resistance co-acting with said lateral wedge pressure-creating means and adapted during release to restore the shoes to normal position; and means also co-acting with said spring resitance for restoring said plates to normal position.

In witness that I claim the foregoing I have hereunto subscribed my name this 28th day of February, 1923.

JOHN F. O'CONNOR.